(12) United States Patent
Ryu et al.

(10) Patent No.: US 9,069,354 B2
(45) Date of Patent: Jun. 30, 2015

(54) METHOD FOR PLANNING PATH FOR AUTONOMOUS WALKING HUMANOID ROBOT

(71) Applicants: KOREA UNIVERSITY RESEARCH AND BUSINESS FOUNDATION, Seoul (KR); CENTER OF HUMAN-CENTERED INTERACTION FOR COEXISTENCE, Seoul (KR)

(72) Inventors: Soo Hyun Ryu, Seoul (KR); Nak Ju Doh, Seoul (KR); Yeon Sik Kang, Seoul (KR); Bum Jae You, Seoul (KR)

(73) Assignee: CENTER OF HUMAN-CENTERED INTERACTION FOR COEXISTENCE, Seoul (KR)

( * ) Notice: Subject to any disclaimer, the term of this patent is extended or adjusted under 35 U.S.C. 154(b) by 181 days.

(21) Appl. No.: 13/731,719

(22) Filed: Dec. 31, 2012

(65) Prior Publication Data

US 2014/0025201 A1     Jan. 23, 2014

(30) Foreign Application Priority Data

Jul. 19, 2012  (KR) ........................ 10-2012-0078999

(51) Int. Cl.
*G06F 19/00* (2011.01)
*G05D 1/02* (2006.01)

(52) U.S. Cl.
CPC ................ *G05D 1/02* (2013.01); *Y10S 901/01* (2013.01); *G05D 1/0214* (2013.01); *G05D 2201/0217* (2013.01)

(58) Field of Classification Search
CPC combination set(s) only.
See application file for complete search history.

(56) References Cited

U.S. PATENT DOCUMENTS

| 6,969,965 B2 * | 11/2005 | Takenaka et al. ........ 318/568.12 |
| 7,337,040 B2 * | 2/2008 | Takenaka et al. ............ 700/245 |

(Continued)

FOREIGN PATENT DOCUMENTS

| KR | 10-0994075 B1 | 11/2010 |
| KR | 10-1146942 B1 | 5/2012 |

OTHER PUBLICATIONS

Soo-Hyun Ryu et al. "Humanoid Path Planning From HRI Perspective: A Scalable Approach via Waypoints With a Time Index", IEEE Transactions on Systems, Man, and Cybernetics—Part B: Cybernetics, Aug. 6, 2012, online, pp. 1-13.

(Continued)

*Primary Examiner* — Jonathan L Sample
(74) *Attorney, Agent, or Firm* — Rabin & Berdo P.C.

(57) ABSTRACT

The present invention provides a method for planning a path for an autonomous walking humanoid robot that takes an autonomous walking step using environment map information, the method comprising: an initialization step of initializing path input information of the autonomous walking humanoid robot using origin information, destination information, and the environment map information; an input information conversion step of forming a virtual robot including information on the virtual robot obtained by considering the radius and the radius of gyration of the autonomous walking humanoid robot based on the initialized path input information; a path generation step of generating a path of the virtual robot using the virtual robot information, the origin information S, the destination information G, and the environment map information; and an output information conversion step of converting the path of the autonomous walking humanoid robot based on the virtual robot path generated in the path generation step.

5 Claims, 8 Drawing Sheets

(56) References Cited

U.S. PATENT DOCUMENTS

| | | | |
|---|---|---|---|
| 7,463,948 B2* | 12/2008 | Orita | 700/245 |
| 7,474,945 B2* | 1/2009 | Matsunaga | 701/25 |
| 7,873,438 B2* | 1/2011 | Sekiya | 700/255 |
| 7,904,200 B2* | 3/2011 | Takenaka et al. | 700/245 |
| 7,987,021 B2* | 7/2011 | Takaoka | 700/259 |
| 8,160,745 B2* | 4/2012 | Sugiura | 700/245 |
| 8,311,676 B2* | 11/2012 | Shih | 700/259 |
| 2004/0013295 A1* | 1/2004 | Sabe et al. | 382/153 |
| 2004/0233290 A1* | 11/2004 | Ohashi et al. | 348/187 |
| 2005/0000543 A1* | 1/2005 | Taylor et al. | 134/18 |
| 2005/0126833 A1* | 6/2005 | Takenaka et al. | 180/8.1 |
| 2005/0159879 A1* | 7/2005 | De Graeve et al. | 701/200 |
| 2005/0182518 A1* | 8/2005 | Karlsson | 700/253 |
| 2006/0095160 A1* | 5/2006 | Orita et al. | 700/248 |
| 2006/0155436 A1* | 7/2006 | Matsunaga | 701/23 |
| 2006/0265103 A1* | 11/2006 | Orita | 700/245 |
| 2007/0156283 A1* | 7/2007 | Takenaka | 700/245 |
| 2008/0202202 A1* | 8/2008 | Ueda et al. | 73/9 |
| 2008/0319661 A1* | 12/2008 | Werner et al. | 701/211 |
| 2009/0287353 A1* | 11/2009 | Shih | 700/259 |
| 2012/0158183 A1* | 6/2012 | Lim et al. | 700/261 |
| 2012/0165979 A1* | 6/2012 | Lim et al. | 700/253 |
| 2012/0203420 A1* | 8/2012 | Kim | 701/25 |

OTHER PUBLICATIONS

Soo Hyun Ryu, A master's thesis "A Path Planner for a Humanoid Robot in Indoor Environment With Polygonal Obstacles", Korea University, Graduate school of Electrical and Electronics, Feb. 2011.

Office Action issued by Korean Intellectual Property Office on Mar. 28, 2014.

* cited by examiner

METHOD FOR PLANNING PATH FOR AUTONOMOUS WALKING HUMANOID ROBOT

CROSS-REFERENCE TO RELATED APPLICATIONS

This application claims the benefit of Korean Patent Application No. 10-2012-0078999, filed on Jul. 19, 2012 in the Korean Intellectual Property Office, which is incorporated herein by reference in its entirety.

BACKGROUND OF THE INVENTION

1. Field of the Invention

Exemplary embodiments of the present invention relate to a method for planning a path for an autonomous walking humanoid robot, and more particularly, to such a planning a path for an autonomous walking humanoid robot, in which a linear path for a time reference is generated and a path is generated more robustly even at an exceptional situation which can occur during the tracking of the path.

2. Description of Related Art

In the past, the demand was concentrated to industrial stationary robots, but recently, researches are in active progress on mobile robots along with an increase in the demand for home service robots.

In case of such mobile robots, for example, a mobile robot such as a disc-shaped vacuum cleaning robot entails a problem in that it is simple to plan a path for the mobile robot but it is difficult to apply the same path planning method as that applied to the mobile cleaning robot to an autonomous walking humanoid robot.

In regard to such a path for the humanoid robot, in the conventional prior art, the path for the mobile robot is planned based on the characteristic, distance, or the like of the environment. To this end, A* algorithm is mainly used and thus the number of rotations of the mobile robot generates a number of paths. However, the path for the mobile robot generated according to such a conventional manner is not natural from the point of view of a human being along with a curved path in which the rotation of the robot occurs frequently. In addition, it is not easy for such a path for the mobile robot to be tracked by a humanoid robot whose kinetics is complex. The complexity of the tracking allows a great position error in a destination to occur in an actual environment in which a change of an environment and various noises are generated.

Moreover, a visibility graph is used to generate a path for a humanoid robot according to the prior art. However, in the case where the conventional visibility graph is simply used, there is a high possibility that the robot will collide with an obstacle due to a disparity between the center of the robot and the center of gyration of the rotating robot, thus making it difficult to generate a reliable path for the robot.

SUMMARY OF THE INVENTION

Accordingly, the present invention has been made to solve the above-mentioned problems occurring in the conventional prior art, and it is an object of the present invention to provide a method for planning a path for an autonomous walking humanoid robot, which generates a linear path for a time reference to which the characteristics of the humanoid robot is reflected by modifying an existing visibility graph.

Another object of the present invention is to provide a method for planning a path for an autonomous walking humanoid robot, which generates a path robustly even at an exceptional situation which can occur during the tracking of the path.

To achieve the above objects, in one aspect, the present invention provides a method for planning a path for an autonomous walking humanoid robot that takes an autonomous walking step using environment map information, the method including: an initialization step of initializing path input information of the autonomous walking humanoid robot using origin information, destination information, and the environment map information; an input information conversion step of forming a virtual robot including information on the virtual robot obtained by considering the radius and the radius of gyration of the autonomous walking humanoid robot based on the initialized path input information; a path generation step of generating a path of the virtual robot using the virtual robot information, the origin information, the destination information, and the environment map information; and an output information conversion step of converting the path of the autonomous walking humanoid robot based on the virtual robot path generated in the path generation step.

In the path planning method for an autonomous walking humanoid robot, the input information conversion step may include: a virtual robot formation step of including virtual robot information containing a radius of the virtual robot as a value obtained by adding the radius of the autonomous walking humanoid robot and the radius of gyration of the autonomous walking humanoid robot extending from the center of the autonomous walking humanoid robot to the center of gyration of the autonomous walking humanoid robot; and an obstacle extension region formation of forming an obstacle extension region of the obstacle based on the environment map information.

In the path planning method for an autonomous walking humanoid robot, the path generation step may include: a macro path generation step of calculating a macro path candidate group from the origin information to the destination information, calculating the time cost required for the autonomous walking humanoid robot to travel along the calculated macro path candidate group, and calculating a macro path having the minimum time cost among the time costs for the macro path candidate group; and a micro path control step of controlling the macro path by calculating an alternative path passing through an intersecting point on path extension lines using the macro path calculated in the macro path generation step and comparing the respective time costs.

In the path planning method for an autonomous walking humanoid robot, the macro path generation step may include: a macro path candidate group formation step of forming the macro path candidate group as paths passing through the outside of the obstacle extension region extending from the origin information to the destination information using the origin information, the destination information, the environment map information, and the obstacle extension region; a macro path candidate group time cost calculation step of calculating the time costs for all the macro path candidate of the macro path candidate group using a walking step pattern (s) on a path between two nodes formed by each macro path candidate of the macro path candidate group, a distance (l) of translation on the path between the nodes, and node rotation angle information ($\theta tot = \theta + \Delta\theta$) determined by considering the forward and backward walking step patterns for the nodes; and a macro path selection step of comparing the time costs calculated in the macro path candidate group time cost calculation step and selecting a macro path candidate having a minimum time cost among the compared time costs as a final macro path.

In the path planning method for an autonomous walking humanoid robot, the node rotation angle information (θtot=θ+Δθ) may include: a node rotation reference angle information θ determined when a walking step pattern (sprev) of the autonomous walking humanoid robot on a path between the node on the macro path candidate and a previous node is a forward step (FS) and a walking step pattern (snext) of the autonomous walking humanoid robot on a path between the node and a next node is a forward step (FS); and a node rotation step angle Δθ determined depending on the walking step pattern (sprev) of the autonomous walking humanoid robot on the path between the node on the macro path candidate and the previous node and the walking step pattern (snext) of the autonomous walking humanoid robot on the path between the node and the next node.

In the path planning method for an autonomous walking humanoid robot, the micro path control step may include: an edge selection step of selecting three consecutive unit edges on the macro path; a path extension line calculation step of calculating path extension lines extending on the macro path for the left and right outermost edges among the three consecutive edges selected in the edge selection step; an intersecting point calculation step of calculating an intersecting point between the path extension lines; an alternative path calculation step of calculating an alternative path formed by the intersecting point and the left and right outermost edges; a path cost calculation step of calculating the time costs for the alternative path and the macro path including the three consecutive edges selected in the edge selection step; and a controlled path selection step of comparing the time costs for the alternative path and the macro path including the three consecutive edges selected in the edge selection step with each other and selecting a macro path having a minimum time cost among the compared time costs as a controlled path, and setting the controlled path as a path of the virtual robot for the selected edges.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

1: autonomous walking humanoid robot
10: sensing unit
20: control unit
30: storage unit
40: arithmetic logical unit
50: driving unit

DESCRIPTION OF SPECIFIC EMBODIMENTS

Hereinafter, a method for planning a path for an autonomous walking humanoid robot according to the present invention will be described in more detail with reference to the accompanying drawings.

Figure 2:
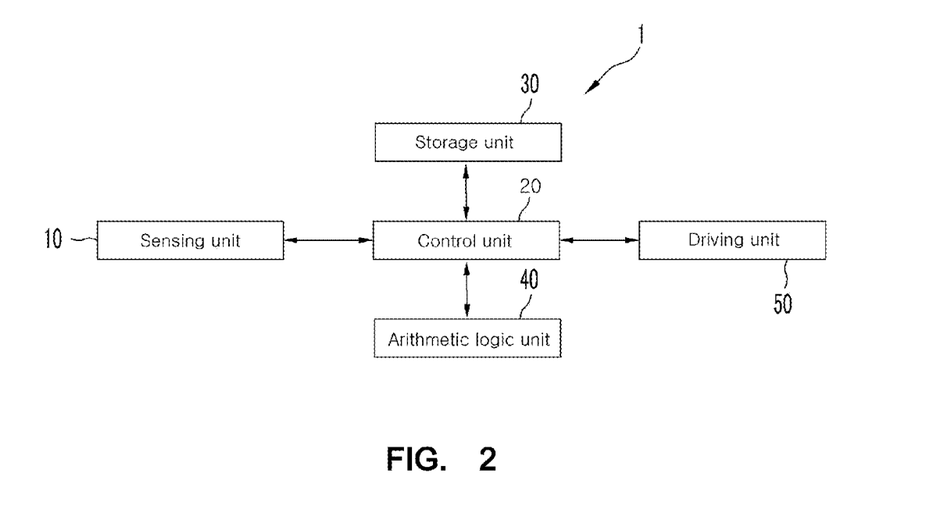
FIG. 2 is a schematic block diagram illustrating the construction of an autonomous walking humanoid robot according a preferred embodiment of the present invention.

The path planning method for an autonomous walking humanoid robot according to the present invention includes an initialization step, an input information conversion step, a path generation step, and an output information conversion step. The autonomous walking humanoid robot 1 includes a sensing unit 10, a control unit 20, a storage unit 30, an arithmetic logical unit 40, and a driving unit 50. The sensing unit 10 includes a laser distance sensor and a position recognition sensor, which serve to acquire environmental information. The laser distance sensor (e.g. laser range finder) acquires the environmental information on an obstacle of a surrounding environment through a laser that irradiates a laser beam, and the position recognition sensor such as a Stargazer acquires the environmental information such as position recognition information through a tag disposed on a ceiling in an environment where an autonomous walking humanoid robot walks. The laser distance sensor can be disposed at a body of the autonomous walking humanoid robot, and the position recognition sensor can be disposed at a head of the autonomous walking humanoid robot.

The control unit 20 is connected to the arithmetic logical unit 20 and the storage unit 30. The storage unit has stored therein the environmental information detected by the sensing unit 10 as well as the reset data for map formation and position recognition of the autonomous walking humanoid robot 1. The arithmetic logical unit 40 extracts and combines environmental features from the environmental information through a predetermined operational process in response to an operation control signal from the control unit 20, and writes environment map information. The driving unit 50 is driven when a walk control signal according to a path from an origin to a destination is applied to the driving unit 50 based on the environment map information of the control unit 20 to enable the autonomous walking humanoid robot 1 to walk along the path of the robot.

Both the sensing operation and the writing/update operations of the environment map information are performed continuously during the walking of the autonomous walking humanoid robot 1. The present invention will be described centering on a path planning method for the autonomous walking humanoid robot using the environment map information.

Figure 1:
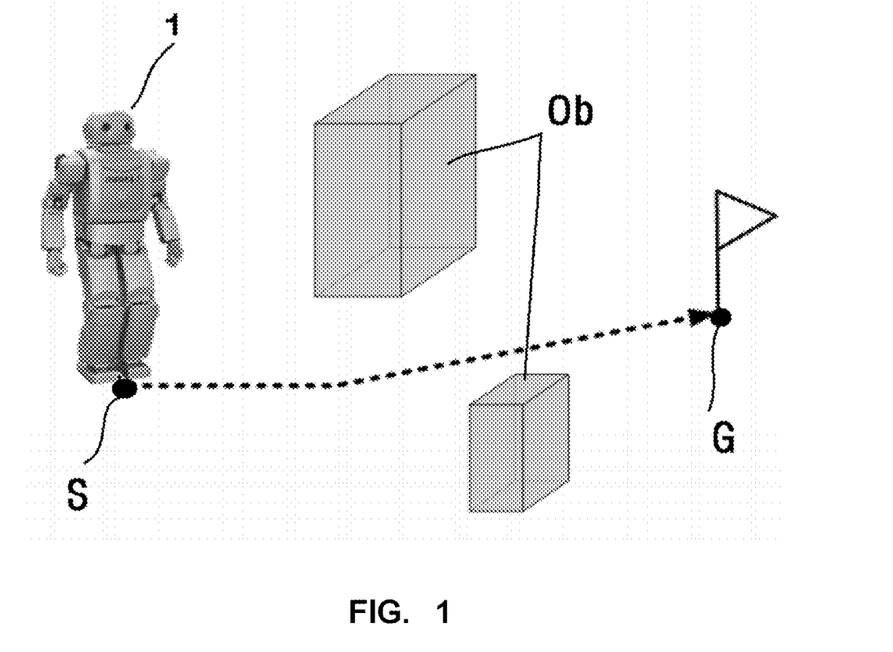
FIG. 1 is a schematic diagrammatic view illustrating an autonomous walking humanoid robot according a preferred embodiment of the present invention.
Figure 3:
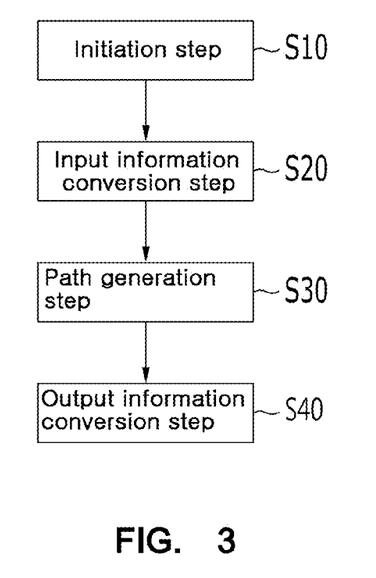
FIG. 3 is a schematic flowchart illustrating a method for planning a path for an autonomous walking humanoid robot according a preferred embodiment of the present invention.

First, the path planning method for an autonomous walking humanoid robot of the present invention includes an initialization step S10, an input information conversion step S20, a path generation step S30, and an output information conversion step S40. In the initialization step S10, the control unit 20 initializes the path input information of the autonomous walking humanoid robot 1 using origin information S, destination information G, and environment map information. That is, the control unit 20 of the autonomous walking humanoid robot 1 initializes a previously planned walking path based on the origin information S and the destination information G, which are stored in the storage unit 30, as well as the environment map information for the surrounding environment formed and updated through the autonomous walking, and prepares for generation of a new path. The origin information S and the destination information G may be structured so as to be stored in the storage unit 30 and may be modified in various manners, such as information inputted by a manager through a separate input unit under the circumstances. That is, as shown in FIG. 1, the environmental information for an obstacle OB is stored in an environmental information map, and the device is provided or the preparation state is formed so as to form a new path based on the origin information S, the destination information G, and the environment map information including the environmental information such as the obstacle information. The path input information includes the origin information S, the destination information G, and information on the radius of the autonomous walking humanoid robot 1 and the radius of gyration about a point other than the center of the autonomous walking humanoid robot 1. In addition, the path input information allows for formation of a new path through confirmation of initialization thereof.

Thereafter, the control unit 20 executes the input information conversion step of forming a virtual robot VR of the autonomous walking humanoid robot 1 based on the path input information inputted in the initialization step S10.

The input information conversion step S20 may include a virtual robot formation step S21 and an obstacle extension region formation step S23. In the virtual robot formation step S21, the control unit 20 includes virtual robot information containing a radius rvr of the virtual robot VR, obtained by adding the radius rc of the autonomous walking humanoid robot 1 and the radius of gyration vc of the autonomous walking humanoid robot 1 extending from the center Prc of the autonomous walking humanoid robot 1 to the center of gyration Pvc of the autonomous walking humanoid robot 1, and a basic orientation angle θi of the virtual robot having the same orientation as that of the autonomous walking humanoid robot 1 when the center Prc of the autonomous walking humanoid robot 1 is moved to the center of the radius rvr of the virtual robot. In this case, the basic orientation angle of the virtual robot indicates the orientation information of an origin and a destination of the robot.

Figure 4:
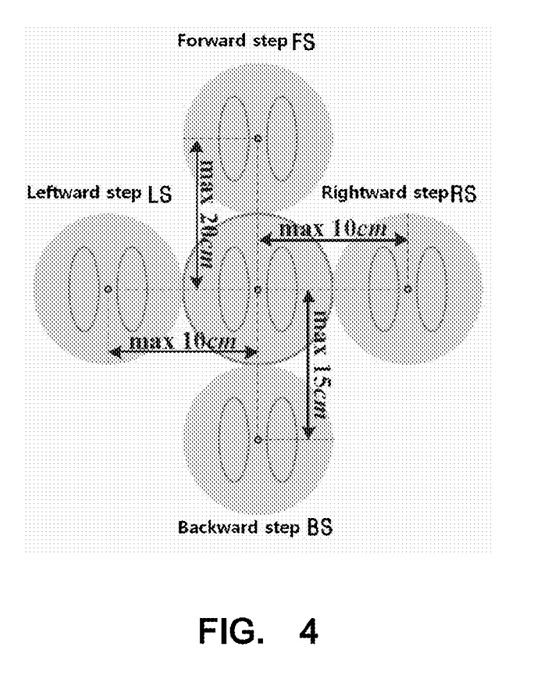
FIGS. 4 and 5 are diagrammatic views illustrating the translation constraint conditions of an autonomous walking humanoid robot.
Figure 5:
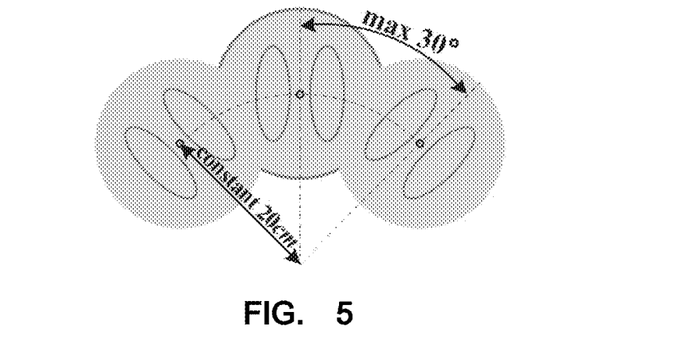

In case of a conventional typical autonomous walking humanoid robot, for example, a mobile robot such as a disc-shaped vacuum cleaning robot, since the center and the center of gyration of the robot nearly coincide with each other, and thus there is no difference in the center and the center of gyration of the robot according to the traveling of the robot. On the other hand, in case of a walking robot such as the autonomous walking humanoid robot 1, the translation constraint condition is additionally provided as shown in FIGS. 4 and 5. Since walking step distances of one unit vary depending on walking step patterns and the center and the center of gyration of the walking robot do not coincide with each other, the walking robot performs a circular motion upon the rotation thereof in position.

Figure 6:
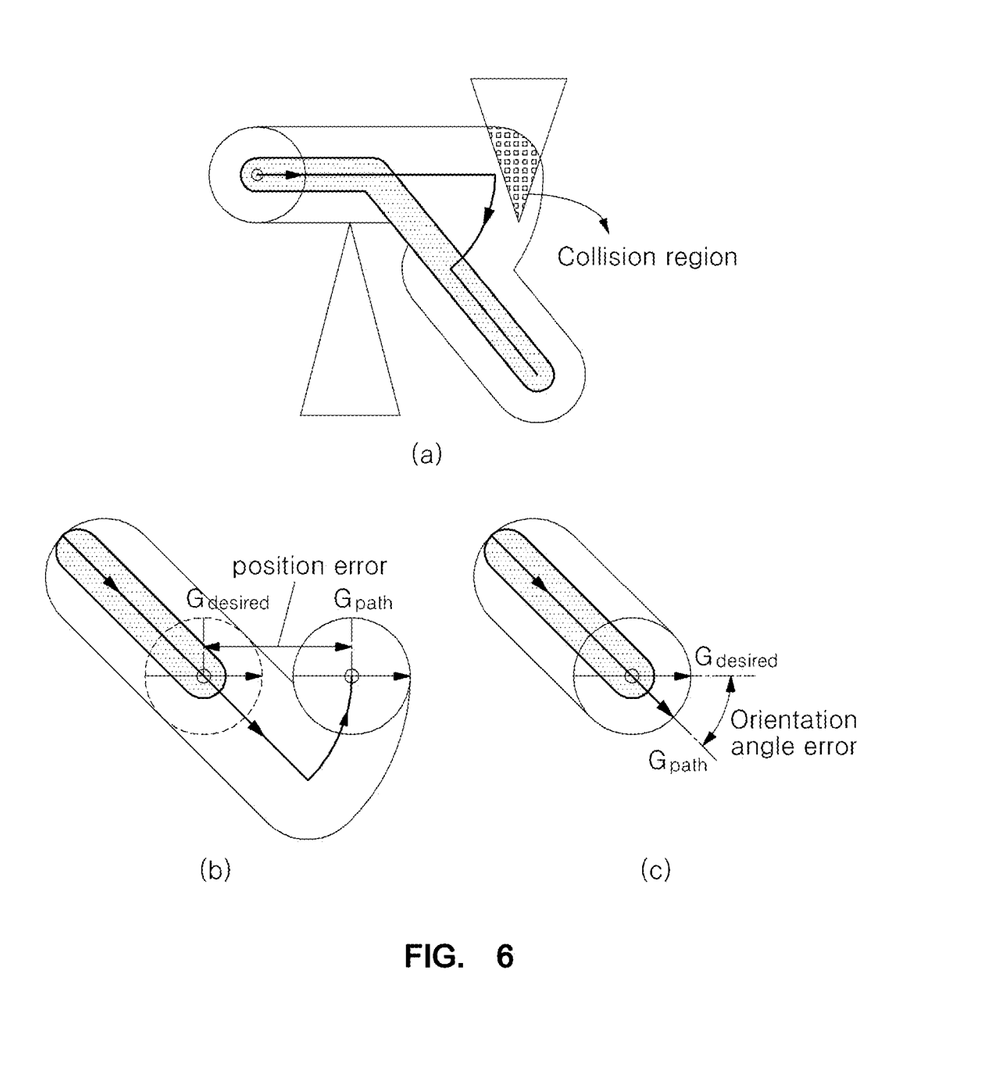
FIG. 6 is a diagrammatic view illustrating a problem occurring in case of using a conventional visibility graph.

FIG. 6 shows a problem associated with the translation constraint condition of the walking robot. In FIG. 6, a dark grey line denotes a path of the walking robot formed using a visibility graph, a black line denotes a path generated by rotation when the walking robot is translated, and a pale grey line denotes a space on a path occupied when the walking robot travels along the path.

As shown in FIG. 6(a), a path is obtained in which the walking robot avoids an obstacle on the path obtained through the visibility graph. But when the walking robot avoids the obstacle, there may occur the case where the walking robot collides with the obstacle because of a rotational error occurring when the center and the center of gyration of the walking robot do not coincide with each other due to the translation constraint condition of the actual walking robot. In addition, as shown in FIGS. 6(b) and 6(c), in the case where the walking robot travels along the path obtained through the visibility graph, a position error may occur due to the rotation of the autonomous walking humanoid robot to make the orientations of the walking humanoid robot to coincide with each other, or an orientation error may occur in the case where the walking robot is not rotated to prevent the occurrence of the position error.

Thus, the present invention generates the virtual robot as an extended visibility graph in order to solve the problem associated with the translation constraint condition of the walking robot, so that a possibility of the walking robot colliding with an obstacle due to rotation of the walking robot can be avoided and a path capable of preventing the position error or the orientation error can be provided.

Figure 7:
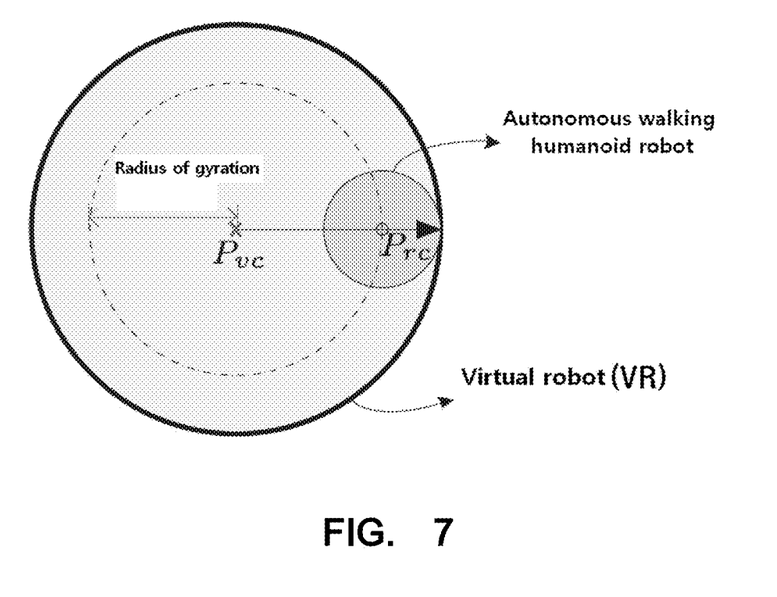
FIG. 7 is a schematic diagrammatic view illustrating a virtual robot of an autonomous walking humanoid robot according a preferred embodiment of the present invention.

As shown in FIG. 7, the virtual robot VR forms a virtual occupied space extended more than a space occupied by the actual autonomous walking humanoid robot 1 in consideration of the radius of gyration of the autonomous walking humanoid robot 1. When it is assumed that the radius of the actual autonomous walking humanoid robot 1 is rc, the radius of gyration of the autonomous walking humanoid robot 1 is vc, the center of the autonomous walking humanoid robot 1 is Prc, and the center of gyration of the autonomous walking humanoid robot 1 is Pvc, the radius rvr of the space occupied by the virtual robot is obtained by adding the radius rc and the radius vc of gyration of the actual autonomous walking humanoid robot 1 as shown in FIG. 7. The virtual robot of FIG. 7 is shown to facilitate the understanding of the invention. Actually, the distance between the center of gyration Pvc of the autonomous walking humanoid robot 1 and the center Prc of the autonomous walking humanoid robot 1 is substantially smaller than the radius rc of the actual autonomous walking humanoid robot 1.

Figure 10:
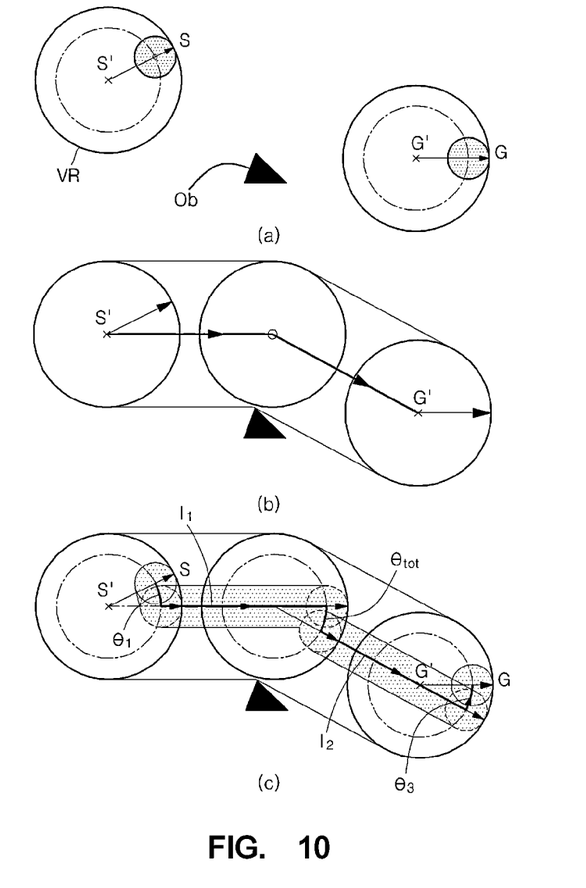
FIG. 10 is a diagrammatic view illustrating a process of generating a macro path in a path planning method for an autonomous walking humanoid robot according a preferred embodiment of the present invention.

In other words, in the input information conversion step S20, the control unit 20 controls the arithmetic logical unit 40 to form the virtual robot VR based on information on the autonomous walking humanoid robot, which includes the center of gyration Pvc, the center Prc, the radius rc, and the radius of gyration vc, which are contained in the path input information. In the virtual robot VR, the origin information S and the destination information G on the autonomous walking humanoid robot 1 can be converted. The origin information S and the destination information G on the autonomous walking humanoid robot 1 contain orientation information as shown in FIG. 10 so that the origin information S and the destination information G are mapped to origin information S' and destination information G' on the virtual robot VR, which have the same orientation information and include the center that is moved from the center Prc of the autonomous walking humanoid robot 1 to the center Pvc of the virtual robot VR. This mapping process may be subjected to an reverse process to allow an output information conversion step S40, which will be described later, to be performed.

The input information conversion step S20 may include an obstacle extension region formation step S23. In the obstacle extension region formation step S23, the control unit 20 forms a region extended centering on an obstacle, which is obtained from the environment map information. That is, in the input information conversion step S20, the control unit 20 can calculate an obstacle extension region needed to set a path for avoiding collision of the autonomous walking humanoid robot 1 with the obstacle using information on the obstacle contained in the environment map information. An extension region (see FIG. 9) is calculated with respect to an obstacle with which the autonomous walking humanoid robot 1 can collide during the walking of the autonomous walking humanoid robot 1 on the environment map information. For example, a vertex extension region is formed around each vertex of the obstacle by rotating a circle about each vertex of the obstacle by the radius (rvr=rc+vc) of the virtual robot VR, and an edge extension region is formed so as to be tangent to the vertex extension region formed by rotating a circle by the radius of the virtual robot VR by extendedly moving three sides or edges of the triangular obstacle outwardly in parallel with the three sides, so that an obstacle extension region surrounding the obstacle is formed. When a path of the virtual robot VR is generated, the center Pvc of the virtual robot VR is not caused to enter the inside of the obstacle extension region but is caused to be tangent to the external surface of the obstacle extension region or is caused to be moved along the external surface of the obstacle extension region, so that the actual autonomous walking humanoid robot 1 can be prevented from colliding with the obstacle.

Figure 8:
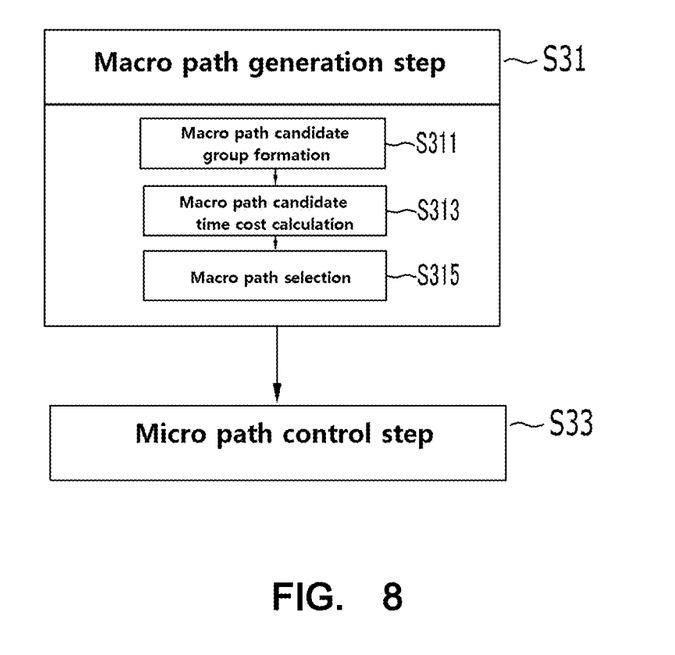
FIG. 8 is a detailed flowchart illustrating a path generation step of a method for planning a path for an autonomous walking humanoid robot according a preferred embodiment of the present invention.

After the input information conversion step S20 is completed, the control unit 20 performs a path generation step S30. In the path generation step S30, the control unit 20 generates a path of the virtual robot VR using the virtual robot information, the origin information S, the destination information G, and the environment map information. The path generation step S30 includes a macro path generation step S31 and a micro path control step S33. In the macro path generation step S31, the control unit 20 calculates a macro path candidate group from the origin information S to the destination information G, calculates the time costs required for the autonomous walking humanoid robot 1 to travel along the calculated macro path candidate group, calculates a macro path having the minimum time cost among the time costs for the macro path candidate group. In the micro path control step S33, the control unit 20 controls the macro path by calculating an alternative path passing through an intersecting point on a path extension line on the path using the macro path calculated in the macro path generation step S31 and comparing the respective time costs.

The macro path generation step S31 includes a macro path candidate group formation step S311, a macro path candidate group time cost calculation step S313, and a macro path selection step S315. In the macro path candidate group formation step S311, the control unit 20 generates a macro path candidate group as paths passing through the outside of the obstacle extension region extending from the origin information S to the destination information G using the origin information S, the destination information G, the environment map information including the obstacle information, and the obstacle extension region for the obstacle information.

Figure 9:
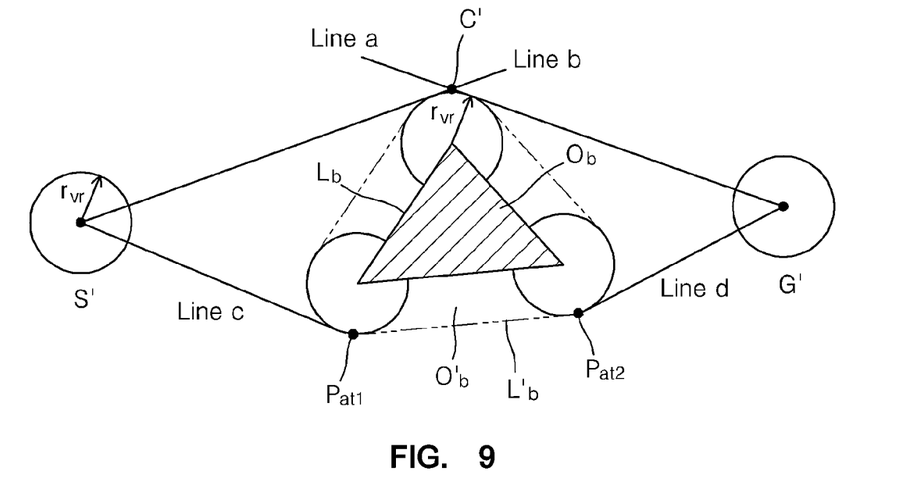
FIG. 9 is a schematic conceptual view illustrating a process of generating a macro path candidate group on a path from an origin from a destination while avoiding an obstacle in a path planning method for an autonomous walking humanoid robot according a preferred embodiment of the present invention.

In FIG. 9, there is shown a process of extracting a path to avoid the obstacle Ob positioned between the origin information S and the destination information G. Also, in FIG. 10, there is shown an exemplary situation for the setting of the macro path candidate group to avoid the obstacle or the obstacle extension region.

First, the control unit 20 calculates the macro path candidate group based on the date stored in the storage unit 30 and the arithmetic logical unit 40. As shown in FIG. 9, an obstacle extension region Ob' of the obstacle Ob is formed such that a circle is rotated about each vertex Pob of the obstacle Ob by the radius (rvr=rc+vc) of the virtual robot VR to form a vertex extension region, and three sides or edges, each joining two consecutive vertices Pob of the triangular obstacle Ob, are extendedly moved outwardly in parallel with the three sides to form three segments tangent to the vertex extension region formed by rotating the circle by the radius (rvr=rc+vc) of the virtual robot VR about each vertex Pob of the obstacle Ob, so that the obstacle extension region is formed as mentioned above. Although there has been described in this embodiment that the obstacle extension region is formed by a method of rotating a circle about the vertices of the obstacle by the radius of the virtual robot and extendedly moving the three side or edges of the obstacle outwardly in parallel with the edges, this is merely an example and obstacle extension region may be constructed in various manners, for example, such as extending the entire area of the obstacle region Ob.

The origin information S and the destination information G of the autonomous walking humanoid robot 1 are updated to origin information S' and destination information G' through the mapping for the virtual robot VR. When the autonomous walking humanoid robot 1 intersects the internal region of the obstacle extension region Ob' on a linear path between the mapped origin information S' and the mapped destination information G', the control unit 20 forms a path passing through the outside of the obstacle extension region Ob'. In this case, the control unit 20 forms segments (lines a, b, c, and d), which are tangent to the obstacle extension region Ob' from the mapped origin information S' and destination information G', and generates one or more macro path candidate group using intersecting points between the segments or contact points between the segments and the obstacle extension region.

For example, when the lines a and b form the segments tangent to the obstacle extension region Ob', the intersecting point C' between the segments is formed so that a path S'-C'-G' can forms a single macro path candidate.

An example of a macro path candidate included in the thus formed macro path candidate group is shown in FIG. 10. In FIG. 10(a), the path input information such as the origin information S and the destination information G is converted and prepared for generation of a path for the virtual robot VR. In this case, orientation information (indicated by arrows)

included in the origin information S and the destination information G is included in the mapped origin information S' and destination information G'. The origin information S and the destination information G form a state of being converted into the mapped origin information S' and destination information G' for each virtual robot VR. A macro path candidate of the macro path candidate group formed is shown in FIG. 10(b), in which only the position movement of the point between the mapped origin information S' and the mapped destination information G' is illustrated. As shown in FIG. 10(c), a correct macro path candidate (solid line; $\theta_1$-$l_1$-$\theta_{tot}$-$l_2$-$\theta_3$) in which the rotation of the robot 1 has been completed is shown by considering orientation information or rotation angle information included in the origin information S' and destination information G'. In this case, $l_1$ and $l_2$ denote the distance of translation of the autonomous walking humanoid robot 1 on the macro path, $\theta_{11}$ and $\theta_3$ denote orientation information in the origin and the destination, and $\theta_{tot}$ denotes node rotation angle information for rotation at a node on the macro path, which will be described later.

In the case where a macro path candidate group including such a macro path candidate is formed, the control unit 20 performs the macro path candidate group time cost calculation step S313 of calculating the time cost for the formed macro path candidate group.

The macro path candidate group time cost calculation step S313 is a step of calculating the time cost for the macro path candidate group, in which the time cost denotes the time required for the virtual robot to travel along each macro path candidate. In the macro path candidate group time cost calculation step S313, the time cost is calculated by the following time cost function J(path), which is formed by addition of a translation time cost function g(l, s) and a rotation time cost function h(θ, sprev, snext):

$$J(\text{path}) = f(l, \theta, s) = \sum_{i=1}^{N} g(l_i, s_i) + h(\theta_i, s_{i-1}, s_i)$$

wherein $l = [l_1, l_2, \ldots, l_N]^T$, $\theta = [\theta_1, \theta_2, \ldots, \theta_N]^T$, $s = [s_1, s_2, \ldots, s_N]^T$, and s0=FS. In addition, l denotes a distance of translation, s denotes a walking step pattern (i.e., forward step (FS), backward step BS, rightward step RS, or leftward step LS), lmax denotes a maximum step distance according to the walking step pattern, and vini denotes an initial velocity of the autonomous walking humanoid robot.

The step execution time according to the walking step pattern is defined by a function of the initial velocity vini and the walking step pattern. When it is assumed that in case of FS and BS for the first walking step in which the autonomous walking humanoid robot initiates a walking step, a step execution time is tf when the initial velocity of the autonomous walking humanoid robot is zero, a step execution time is tc in case of FS and BS for the consecutive walking step, and a step execution time is in case of FS and BS for the side walking step, the translation time cost function g(l, s) is represented by the following Equation:

$$g(l, s) = \begin{cases} t_f + t_c \times \left\lceil \frac{l}{l_{max}(s)} \right\rceil & \text{for } s \in \{FS, BS\} \\ t_s \times \left\lceil \frac{l}{l_{max}(s)} \right\rceil & \text{for } s \in \{FS, BS\} \end{cases}$$

wherein ⌈ ⌉ denotes a round-up operator.

In addition, the rotation time cost function h is also defined as node rotation angle information (θtot=θ+Δθ). The node rotation angle information θtot is rotation angle information determined by considering the forward and backward walking step patterns for a node on a path formed by each macro path candidate included in the macro path candidate group.

As shown in FIG. 10(c), the macro path candidate included in the macro path candidate group of the virtual robot VR constitutes a plurality of nodes, and the rotation of the virtual robot occurs at each node. This rotation is not determined by a walking step pattern on a path between two nodes but is determined depending on whether or not there is a change in the walking step pattern on paths before and after each node. That is, the node rotation angle information on each node does not depend on a current walking step pattern on the node path but depends on a change in the walking step pattern on the path. The rotation angle information on a relevant node by this change in the walking step pattern is represented by node rotation step angle information Δθ, which is represented by the following Table 1 according a change in a previous walking step pattern and a next walking step pattern on two adjacent paths between a previous node and the relevant node and a next node and the relevant node with the relevant node positioned between the previous node and the next node:

TABLE 1

|  | sprev | | | |
| --- | --- | --- | --- | --- |
| snext | FS | BS | LS | RS |
| SF | 0 | π | −π/2 | π/2 |
| BS | −π | 0 | π/2 | −π/2 |
| LS | π/2 | −π/2 | 0 | Π |
| RS | −π/2 | π/2 | −π | 0 |

Here, the rotation in the counterclockwise direction has a positive (+) value.

Figure 11:
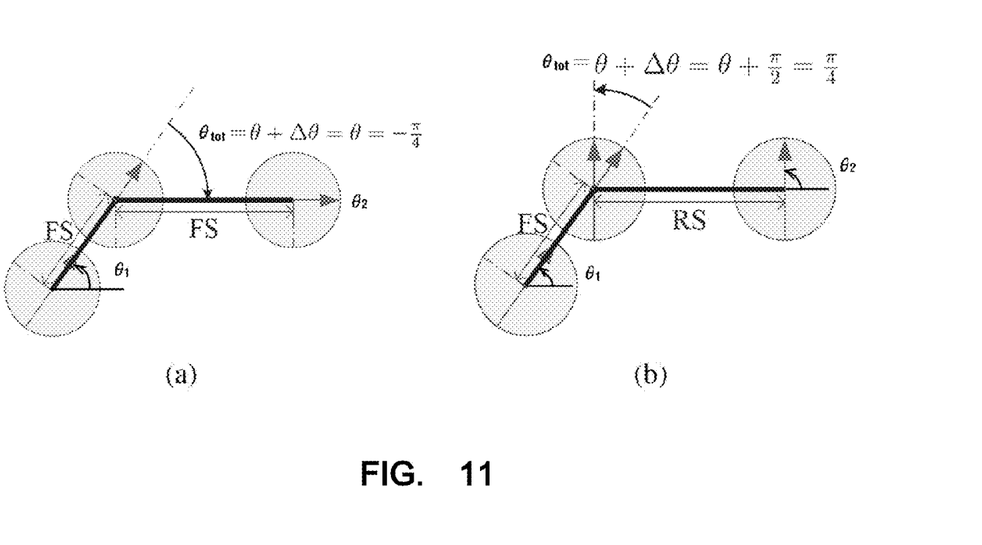
FIG. 11 is a diagrammatic view illustrating node rotation angle information for a node on a macro path candidate according to a walking step pattern on the macro path candidate in a path planning method for an autonomous walking humanoid robot according a preferred embodiment of the present invention.

In FIG. 11, there is shown a change in the angle of the autonomous walking humanoid robot for a different walking step pattern. In FIG. 11(a), there is shown a case where the autonomous walking humanoid robot 1 travels in a FS-only walking step pattern, i.e., a walking step pattern (sprev) on a path between a relevant node P on the macro path candidate and a previous node is FS, and a walking step pattern (snext) on a path between the relevant node P and a next node is FS. The node rotation angle information (θtot=θ+Δθ) on the node P includes node rotation reference angle information θ and node rotation step angle Δθ. In other words, the node rotation reference angle information θ indicates a difference in orientation or rotation angle at nodes positioned before and after the relevant nodes when the autonomous walking humanoid robot 1 continues to maintain the forward step (FS) while passing through the node. In addition, the node rotation step angle information Δθ indicates angle correction information related to correction of a change in the walking step pattern during the passing of the autonomous walking humanoid robot 1 through the relevant node. When the nodes positioned before and after the node P are S' and G' and the orientation or rotation angle information of the autonomous walking humanoid robot 1 at the respective nodes is θ1 and θ2, the node rotation angle information at the relevant node P is represented by the following equation: θtot=θg−θs=θ+Δθ. Thus, in FIG. 11(a), since both the walking step pattern (sprev) and the walking step pattern (snext) are FS, the node rotation angle information θtot has a value of −π/4 (i.e., θ+Δθ=θ+0=θ=−π/4). On the other hand, in FIG. 11(b), since the walking step pattern (sprev) is FS and the walking step pattern (snext) is RS, the node rotation step angle information $\Delta\theta$ according to a change in the walking step pattern has $\pi/2$ so that the node rotation angle information $\theta$tot has a value of $\pi/4$ (i.e., $\theta2-\theta1=\theta+\Delta\theta=\theta+\pi/2=\pi/4$).

The rotation time cost function (h) considering the node rotation angle information at the node on the macro path candidate phase is represented by the following Equation:

$$h(\theta, s_{prev}, s_{next}) = t_s \times \left\lceil \frac{\text{mod}_{-\pi \sim \pi}\{\theta + \Delta\theta(s_{prev}, s_{next})\}}{\theta_{max}} \right\rceil$$

wherein mod denotes a modulation function ranging from $-\pi$ to $\pi$.

All the node rotation angle information as mentioned above with reference to FIGS. 10 and 11 is included at respective way points (or nodes) on the macro path candidate of the macro path candidate group. In case of the conventional visibility graph (a), only information on the distance between nodes is provided, whereas in case of the inventive extended visibility graph forming the virtual robot, the node rotation angle information formed by the paths between each node and adjacent nodes is provided.

After calculation of the time costs for all the macro path candidates of the macro path candidate group is completed using the translation time cost function and the rotation time cost function, the control unit 20 performs the macro path selection step S315. In the macro path selection step S315, the control unit 20 compares the time costs for the macro path candidate group calculated in the macro path candidate group time cost calculation step S313 and selects a macro path candidate having the lowest time cost among the compared time costs as a final macro path. That is, the control unit 20 determines that the macro path candidate having the lowest time cost is a path on which the shortest time is required for travel of the autonomous walking humanoid robot 1, and selects the macro path candidate having the lowest time cost as a final macro path.

Figure 12:
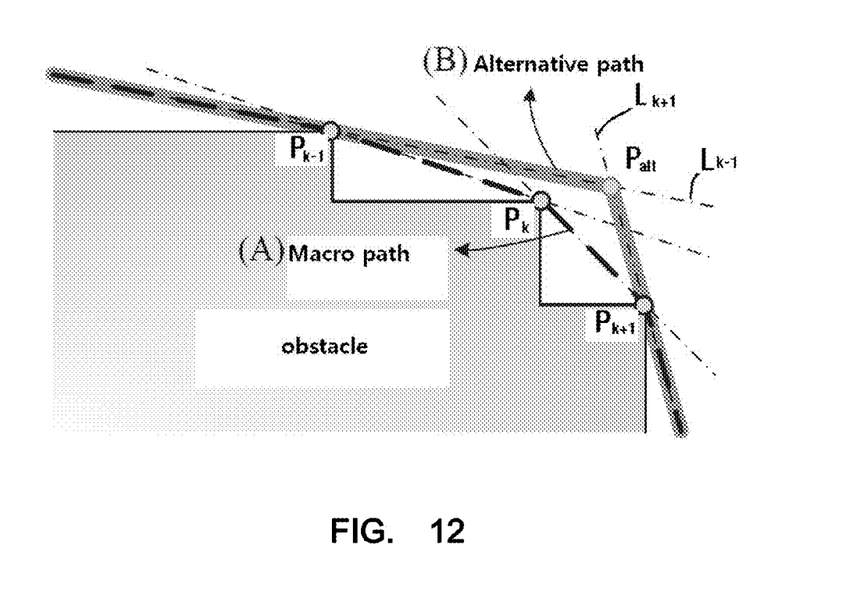
FIG. 12 is a diagrammatic view illustrating a micro path control step in a path planning method for an autonomous walking humanoid robot according a preferred embodiment of the present invention.
Figure 13:
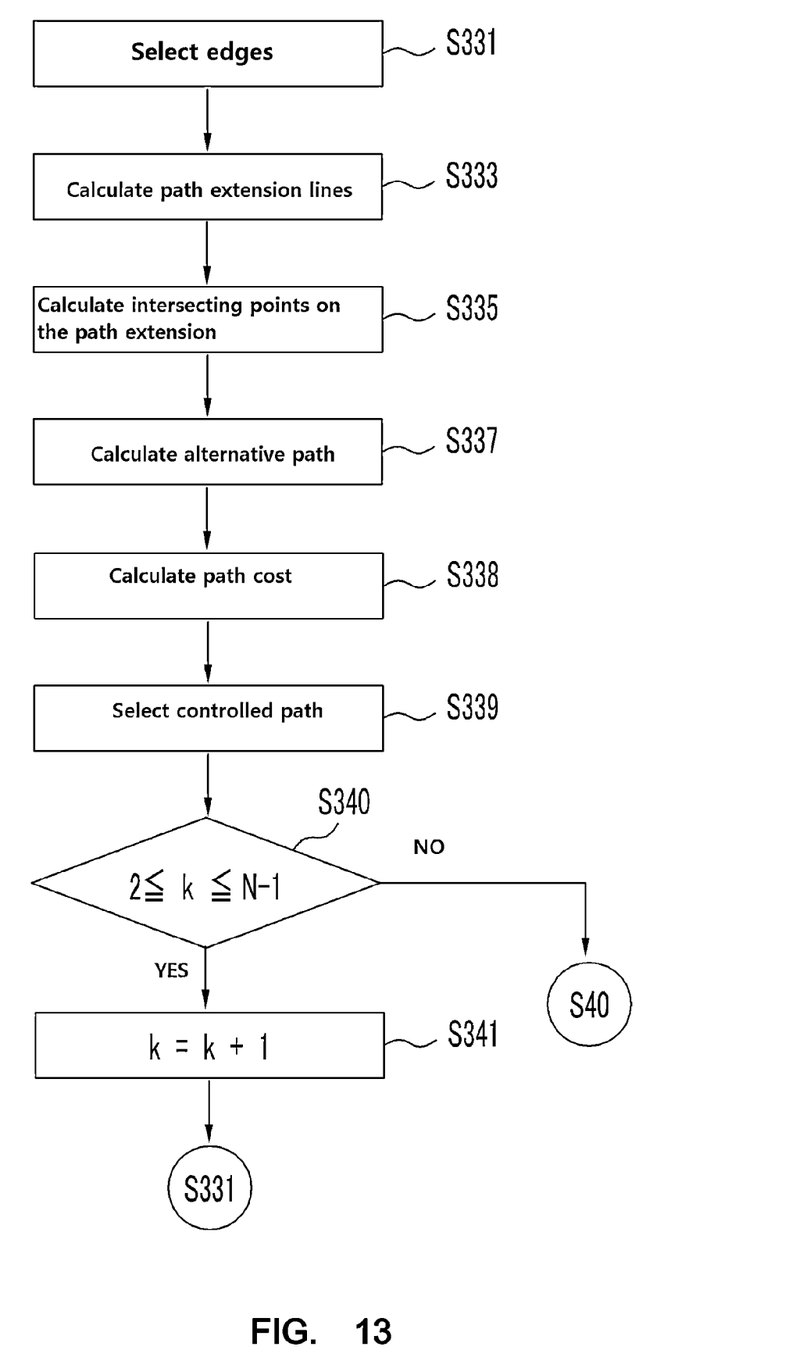
FIG. 13 is a detailed flowchart illustrating the micro path control step in a path planning method for an autonomous walking humanoid robot according a preferred embodiment of the present invention.
Figure 14:
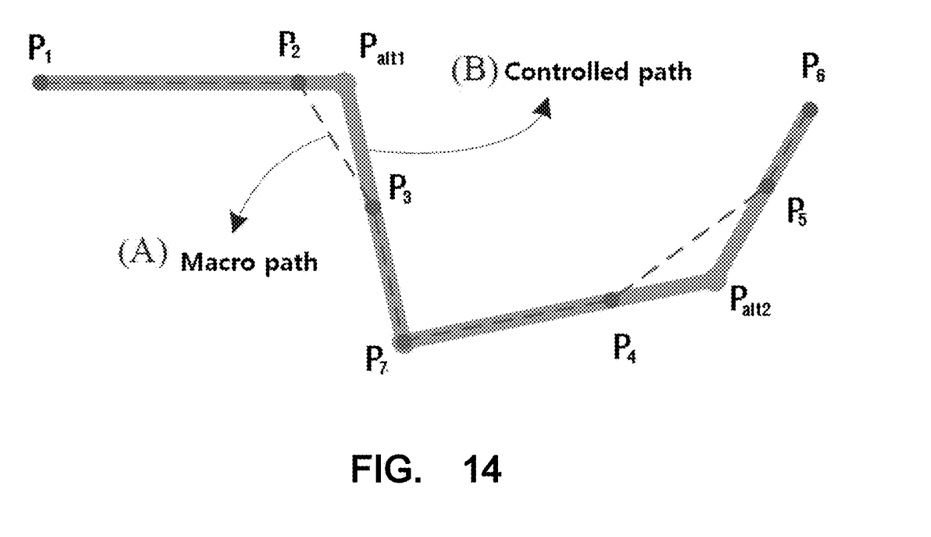
FIG. 14 is a diagrammatic view illustrating a final path obtained through the micro path control step in a path planning method for an autonomous walking humanoid robot according a preferred embodiment of the present invention.

Thereafter, the control unit 20 executes the micro path control step S33. The detailed description of the micro paths in the micro path control step S33 is shown in FIG. 12, a detailed flowchart of the micro path control step S33 is shown in FIG. 13, and an example of a path controlled through the micro path control step S33 and a final path obtained through the controlled path is shown in FIG. 14.

The micro path control step S33 includes an edge selection step S331, a path extension line calculation step S333, an intersecting point calculation step S335, an alternative path calculation step S337, a path cost calculation step S338, and a controlled path selection step S339. After this micro path control process is performed with respect to all the three edges selected sequentially on the macro path generated in the macro path generation step S31, it is performed with respect to the total edge combinations, so that the macro path is controlled and then the micro path control process is terminated.

First, at the edge selection step S331, the control unit 20 selects three consecutive unit edges existing on the macro path. Here, the term "edge" refers to a node protruded in a direction opposite to an obstacle region, which does not intrude into a path region or the like along which the autonomous walking humanoid robot 1 passes through a region of the obstacle or the like on the macro path. As shown in FIG. 12, three consecutive edges ($P_{k-1}$, $P_k$, $P_{k+1}$) are selected. That is, the macro path ($P_{k-1}$-$P_k$-$P_{k+1}$) is formed in the order of the following three consecutive edges: $P_{k-1}$, $P_k$, and $P_{k+1}$.

Then, the control unit 20 executes the path extension line calculation step S333. In the path extension line calculation step S333, the control unit 20 calculates path extension lines $L_{k-1}$ and $L_{k+1}$ extending on the macro path for the left and right outermost edges $P_{k-1}$ and $P_{k+1}$ among the three consecutive edges selected in the edge selection step. Thereafter, the program proceeds to the intersecting point calculation step S335 where the control unit 20 calculates an intersecting point $P_{alt}$ between the path extension lines $L_{k-1}$ and $L_{k+1}$.

After the intersecting point $P_{alt}$ is calculated, the control unit 20 controls the arithmetic logical unit 40 to execute the alternative path calculation step S337 to calculate an alternative path ($P_{k-1}$-$P_{alt}$-$P_{k+1}$) formed by the intersecting point $P_{alt}$ and the left and right outermost edges $P_{k-1}$ and $P_{k+1}$. Then, the control unit 20 executes the path cost calculation step S338 of calculating the time costs for the alternative path ($P_{k-1}$-$P_{alt}$-$P_{k+1}$) and the macro path ($P_{k-1}$-$P_k$-$P_{k+1}$) including the three consecutive edges selected in the edge selection step. The time costs for the respective paths are calculated using the time cost function as mentioned above. Subsequently, the program proceeds to the controlled path selection step 339 where the control unit 20 compares the time costs for the alternative path and the macro path including the three consecutive edges selected in the edge selection step with each other, and selects a macro path having a minimum time cost among the compared time costs as a controlled path.

Thereafter, the control unit 20 determines whether or not the control of the detailed paths for the entire macro path is completed. If it is determined that the control of the detailed paths is not completed, the program returns to the step S333 where the control unit 20 repeatedly perform the control operation. On the other hand, if it is determined that the control of the detailed paths is completed, the control unit 20 terminates the control operation executed by the control unit and establishes, as a final path, the macro path in which the detailed paths are controlled to be a controlled path. Then, the program proceeds to the output information conversion step S40 where the control unit 20 instructs the driving unit 50 to allow the autonomous walking humanoid robot to continue to take a predetermined walking step. More specifically, after the controlled path selection step S339 is completed, the program proceeds to step S340 where the control unit 20 determines whether or not a factor k used to select the edges is smaller than a value N−1 that is set by using the number N of the all the edges forming the macro path. If it is determined at step 340 that the factor k is smaller than the vale N−1, the program proceeds to step S341 where the control unit 20 controls the arithmetic logical unit to increment the factor k by 1, and the program returns to step S331. On the contrary, if it is determined at step 340 that the factor k exceeds the vale N−1, the control unit 20 determines that all the detailed paths for the macro path are controlled and the program proceeds to step S40.

In FIG. 14, there is shown a result in which the controlled path is formed by a part of the alternative path for the macro path through the micro path control step. The macro path is formed as a path ($P_1$-$P_2$-$P_3$-$P_7$-$P_4$-$P_5$-$P_6$) indicated by a dotted line whereas an intersecting point $P_{alt1}$ between two path extension lines extending on macro path segments ($P_1$-$P_2$ and $P_3$-$P_7$) and an intersecting point $P_{alt2}$ between two path extension lines extending on macro path segments ($P_7$-$P_4$ and $P_5$-$P_6$) are generated. In addition, since the time cost for the macro path segment ($P_1$-$P_{alt1}$-$P_3$) is lower than the time costs for the macro path segment $P_1$-$P_2$-$P_3$, and the time cost for the macro path segment ($P_7$-$P_{alt2}$-$P_5$) is lower than the time cost for the macro path segment $P_7$-$P_4$-$P_5$, the macro path is controlled finally such that The final path obtained through the macro path generation step and the micro path control step is formed as a macro path $(P_1\text{-}P_{alt1}\text{-}P_3\text{-}P_7\text{-}P_{alt2}\text{-}P_5\text{-}P_6)$.

In the meantime, in the output information conversion step S40, the control unit 20 converts the final path calculated in the path generation step 30 into path information of the actual autonomous walking humanoid robot 1. That is, the final path calculated in the path generation step 30 is a path for the virtual robot VR, and thus the control unit 20 converts the final path into path information required for the walking of the actual autonomous walking humanoid robot 1 and calculates information on an actual path from the origin to the destination. Then, the control unit 20 generates a driving control signal for application to the driving unit 50 to allow the robot 1 to perform the autonomous walking operation.

The above-mentioned embodiments are intended to describe the present invention illustrative, but the invention is not limited to these embodiments and can be modified variously.

As described above, the map formation method, the position recognition method, and the plane feature extraction method of the mobile robot according to the present invention has the following various effects.

First, the path planning method for autonomous walking humanoid robot according to the present invention introduces the concept of the virtual robot and uses the modification of the visibility graph so that path generation reflecting the characteristics of the humanoid robot is enabled.

Second, the path planning method for autonomous walking humanoid robot according to the present invention uses the extended visibility graph and generates a path based on the time so that a path can be generated which is linear, has a smaller number of rotations, and is natural to a human's naked eyes.

Third, the path planning method for autonomous walking humanoid robot according to the present invention enables the path planning that is more precise and stable and requires the minimum time through the macro path generation and the micro path control While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A method for planning a path for an autonomous walking humanoid robot that takes an autonomous walking step using environment map information, the method comprising:
    an initialization step of initializing path input information of the autonomous walking humanoid robot using origin information, destination information, and the environment map information;
    an input information conversion step of forming a virtual robot including information on the virtual robot obtained by considering the radius and the radius of gyration of the autonomous walking humanoid robot based on the initialized path input information;
    a path generation step of generating a path of the virtual robot using the virtual robot information, the origin information S, the destination information G, and the environment map information; and
    an output information conversion step of converting the path of the autonomous walking humanoid robot based on the virtual robot path generated in the path generation step,
    wherein the path generation step comprises:
    a macro path generation step of calculating a macro path candidate group from the origin information to the destination information, calculating the time cost required for the autonomous walking humanoid robot to travel along the calculated macro path candidate group, and calculating a macro path having the minimum time cost among the time costs for the macro path candidate group; and
    a micro path control step of controlling the macro path by calculating an alternative path passing through an intersecting point on path extension lines using the macro path calculated in the macro path generation step and comparing the respective time costs.

2. The method according to claim 1, wherein the input information conversion step comprises:
    a virtual robot formation step of including virtual robot information containing a radius of the virtual robot as a value obtained by adding the radius of the autonomous walking humanoid robot and the radius of gyration of the autonomous walking humanoid robot extending from the center of the autonomous walking humanoid robot to the center of gyration of the autonomous walking humanoid robot; and
    an obstacle extension region formation of forming an obstacle extension region of the obstacle based on the environment map information.

3. The method according to claim 1, wherein the macro path generation step comprises:
    a macro path candidate group formation step of forming the macro path candidate group as paths passing through the outside of the obstacle extension region extending from the origin information to the destination information using the origin information, the destination information, the environment map information, and the obstacle extension region;
    a macro path candidate group time cost calculation step of calculating the time costs for all the macro path candidate of the macro path candidate group using a walking step pattern (s) on a path between two nodes formed by each macro path candidate of the macro path candidate group, a distance (l) of translation on the path between the nodes, and node rotation angle information ($\theta tot = \theta + \Delta\theta$) determined by considering the forward and backward walking step patterns for the nodes; and
    a macro path selection step of comparing the time costs calculated in the macro path candidate group time cost calculation step and selecting a macro path candidate having a minimum time cost among the compared time costs as a final macro path.

4. The method according to claim 3, wherein the node rotation angle information ($\theta tot = \theta + \Delta\theta$) comprises:
    a node rotation reference angle information $\theta$ determined when a walking step pattern (sprev) of the autonomous walking humanoid robot on a path between the node on the macro path candidate and a previous node is a forward step (FS) and a walking step pattern (snext) of the autonomous walking humanoid robot on a path between the node and a next node is a forward step (FS); and
    a node rotation step angle $\Delta\theta$ determined depending on the walking step pattern (sprev) of the autonomous walking humanoid robot on the path between the node on the macro path candidate and the previous node and the walking step pattern (snext) of the autonomous walking humanoid robot on the path between the node and the next node.

5. The method according to claim 1, wherein the micro path control step comprises:
- an edge selection step of selecting three consecutive unit edges on the macro path;
- a path extension line calculation step of calculating path extension lines extending on the macro path for the left and right outermost edges among the three consecutive edges selected in the edge selection step;
- an intersecting point calculation step of calculating an intersecting point between the path extension lines;
- an alternative path calculation step of calculating an alternative path formed by the intersecting point and the left and right outermost edges;
- a path cost calculation step of calculating the time costs for the alternative path and the macro path including the three consecutive edges selected in the edge selection step; and
- a controlled path selection step of comparing the time costs for the alternative path and the macro path including the three consecutive edges selected in the edge selection step with each other and selecting a macro path having a minimum time cost among the compared time costs as a controlled path, and setting the controlled path as a path of the virtual robot for the selected edges.

\* \* \* \* \*